United States Patent [19]

Shirasaka et al.

[11] Patent Number: 4,955,064
[45] Date of Patent: Sep. 4, 1990

[54] GRAPHIC EDGE EXTRACTING APPARATUS

[75] Inventors: Akifumi Shirasaka, Yokohama; Kunio Seto, Inagi; Masaki Hamada, Tokyo; Yukari Shibuya, Kawasaki, all of Japan

[73] Assignee: Canon Kabushiki Kaisha, Tokyo, Japan

[21] Appl. No.: 103,598

[22] Filed: Oct. 2, 1987

[30] Foreign Application Priority Data

Oct. 20, 1986 [JP] Japan .................. 61-250306

[51] Int. Cl.⁵ .............................................. G06K 9/00
[52] U.S. Cl. ....................................... 382/22; 382/44
[58] Field of Search ................... 382/22, 44, 54, 61, 382/27, 34, 21

[56] References Cited

U.S. PATENT DOCUMENTS

3,882,454  5/1975  Marie et al. .......................... 382/22
3,899,771  8/1975  Saraga et al. ........................ 382/21
4,587,617  5/1986  Barker et al. ........................ 382/34

Primary Examiner—Leo H. Boudreau
Attorney, Agent, or Firm—Fitzpatrick, Cella Harper & Scinto

[57] ABSTRACT

A graphic edge extracting apparatus includes a memory unit for storing graphic image data and a graphic edge pixel extracting unit for developing the graphic image data on a bit plane in a bit map memory in the memory unit and executing bitblt (bit block transfer: synthesis during drawing) processing a plurality of times, thereby extracting inner edge pixels of the graphic image.

9 Claims, 6 Drawing Sheets

|   | x−1 | x | x+1 |
|---|---|---|---|
| y−1 | f(x−1,y−1) | f(x,y−1) | f(x+1,y−1) |
| y | f(x−1,y) | f(x,y) | f(x+1,y) |
| y+1 | f(x+1,y+1) | f(x,y+1) | f(x+1,y+1) |

FILTER CALCULATION
$y(x,y) = (f(x,y) \oplus f(x,y-1)) + (f(x,y) \oplus f(x,y+1))$
$\quad + (f(x,y) \oplus f(x-1,y)) + (f(x,y) \oplus f(x+1,y))$

GRAPHIC EDGE EXTRACTING APPARATUS

BACKGROUND OF THE INVENTION

1. Field of the Invention

The present invention relates to an image processor and, more particularly, to a graphic edge extracting apparatus capable of extracting inner edge pixels of any painted graphic image at high speed.

2. Related Background Art

A conventional edge extracting apparatus for extracting an edge of a graphic image in an image processor uses a proper filter calculation 2 (FIG. 18 (2)) to calculate differences between a pixel of interest and adjacent pixels on an image plane 1 which is developed in an image memory, as shown in FIG. 18(1) and sequentially performs the filter calculation 2 of all the points on the image plane 1, thereby extracting boundary pixels 5 between a graphic image 3 and a non-graphic image portion 4 as an edge of the graphic image.

However, in the above conventional edge extracting apparatus, the edge boundary pixels 5 of the graphic image are obtained as an edge line. That is, pixels which actually form an edge of the graphic image are not extracted. Therefore, positions of the pixels which actually form the edge must be caluculated by coordinate values of the edge line. Especially, it is difficult to reconstruct an original perfect graphic image from the edge line. In addition, the filter calculation must be performed for each point on the image plane. Therefore, a pixel of interest and its adjacent pixels on the image plane must be repeatedly accessed, and their differences the differences between them); must be repeatedly calculated. As a result, calculation processing time is prolonged.

SUMMARY OF THE INVENTION

It is an object of the present invention to provide a graphic image extracting apparatus capable of extracting inner edge pixels of any graphic image at high speed, under program control, simpler than that of a conventional system, using a filter calculation in memory access cycles fewer than those of the conventional system, and capable of easily reconstructing an original graphic image even if graphic image information is compressed using the edge pixels.

BRIEF DESCRIPTION OF THE DRAWINGS

FIGS. 18(1) and 18(2) are views for explaining a conventional system using a space filter.

DETAILED DESCRIPTION OF THE PREFERRED EMBODIMENTS

The preferred embodiments of the present invention will be described below with reference to the accompanying drawings.

Figure 1:
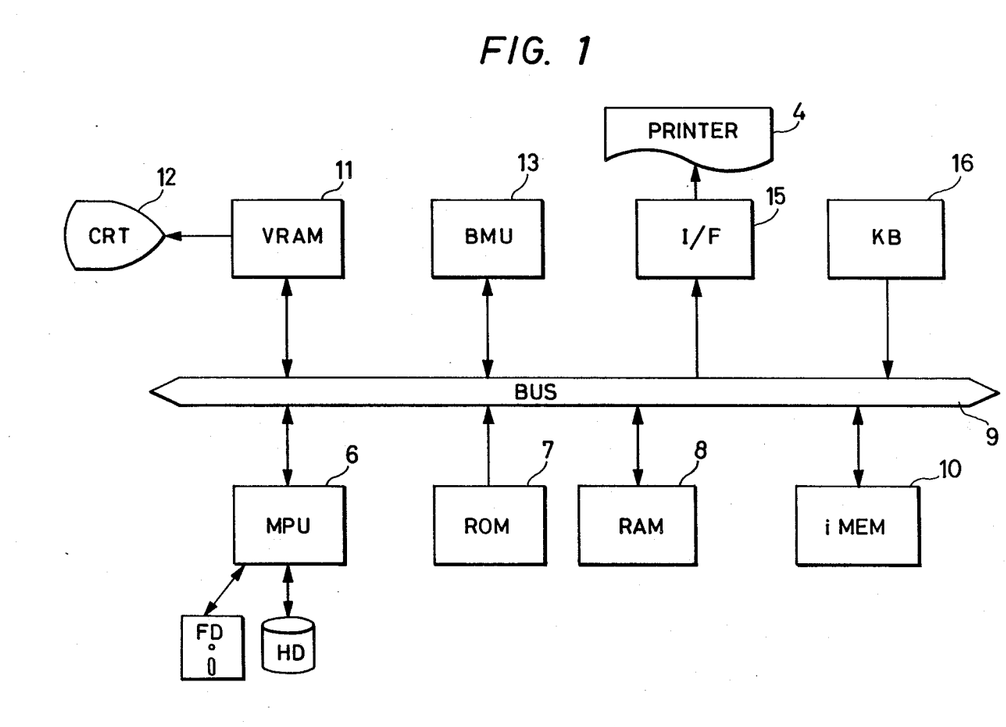
FIG. 1 is a block diagram of an arrangement of a graphic edge extracting apparatus according to the present invention.

FIG. 1 shows an arrangement of a graphic edge extracting apparatus of the present invention. In FIG. 1, and MPU (Main Processor Unit) 6 controls the entire graphic edge extracting apparatus and executes graphic edge extracting operations in accordance with flow charts shown in FIGS. 13 to 17 and described later. External memories such as a floppy disk (FD) and a hard disk (HD) are connected to the MPU 6. A ROM (Read-Only Memory) 7 stores a variety of control programs for the MPU 6 and the graphic edge extracting processing programs shown in FIGS. 13 to 17. A RAM (Random Access Memory) 8 temporarily stores character data or other various data input externally through a bus line 9. An image memory (iMEM) 10 stores image data. A bit plane to be described later can be developed in the RAM 8 and the iMEM 10. A video memory (VRAM) 11 develops data on a bit map, and the data will be displayed on CRT display 12. For example, if the data is character data, a character corresponding to a code of the data is developed as an electrostatic latent image in the VRAM 11. A cursor is directly generated on a display area of the VRAM 11 under the control of the MPU 6, thereby displaying the character. A BMU (Bit Manipulation Unit) 13 has a DMA (Direct Memory Access) function for exchanging data between input-/output apparatuses such as the RAM 8, the iMEM 10, the VRAM 11, and a printer 14, without occupying i.e., without requiring intervention of); the MPU 6. An interface 15 connects the printer 14 with bus line 9. An operator can input various data and commands by means of a keyboard 16.

Graphic edge extracting processing using the image processor having the above arrangement will be described with reference to the flow charts shown in FIGS. 13 to 17.

(First Embodiment)

Figure 2:
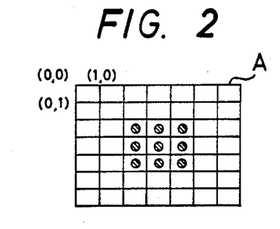
FIG. 2 is a plan view of an original image on a bit plane.
Figure 3:
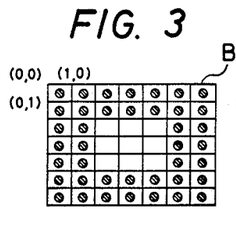
FIGS. 3 to 12 are respectively plan views of a figure obtained after the original image on the bit plane is subjected to bitblt (bit block transfer) for transfer.
Figure 4:
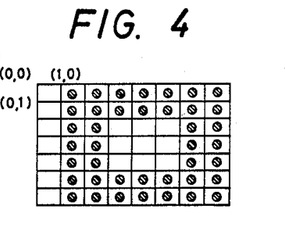
Figure 5:
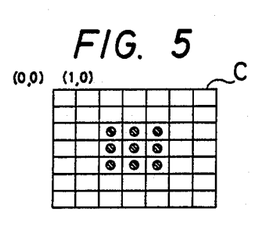
Figure 6:
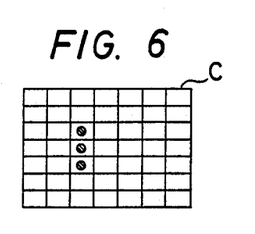
Figure 7:
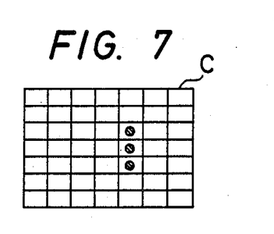
Figure 8:
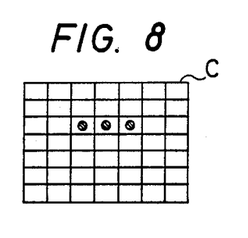
Figure 9:
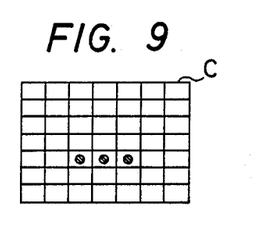
Figure 13:
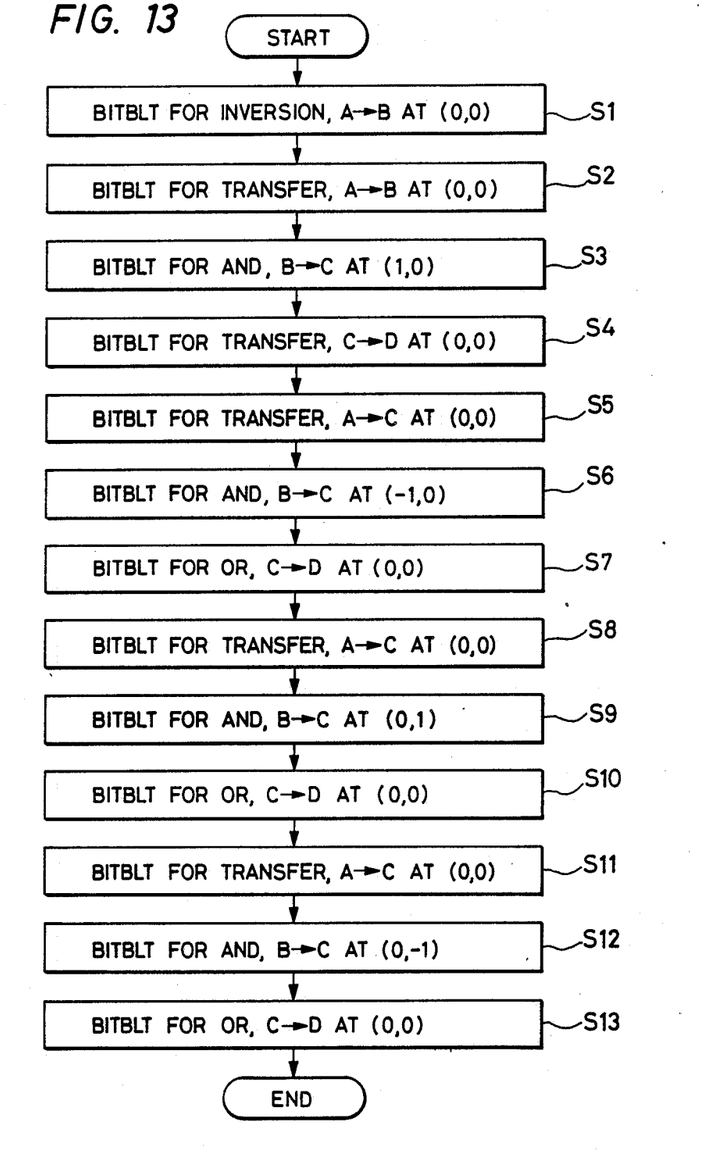
FIGS. 13 to 17 are flow charts for explaining graphic edge extracting operations respectively of first to fifth embodiments.

FIG. 13 is a flow chart according to a first embodiment of the present invention. When an instruction for extracting a graphic edge is input from the keyboard 16, the MPU 6 executes graphic edge extracting processing (FIG. 13) for a designated portion of a painted graphic image displayed on the CRT display 12. In this case, if an instruction of graphic edge extracting processing for a square (to be referred to as an original figure hereinafter) as shown in FIG. 2 is input, the MPU 6 develops the original figure on an image plane (to be referred to as a bit plane) A of the iMEM 10. In step S1, the MPU 6 executes bitblt (bit block transfer: a function for transferring a rectangular area in a frame buffer (in this case, the iMEM 10)) processing for inversion, i.e., inverts the original figure of the bit plane A on a bit plane B with respect to a relative position (0,0), thereby obtaining an inverted pixel array as shown in FIG. 3. Then, in step S2, the MPU 6 executes bitblt processing for transfer, i.e., transfers the original figure of the bit plane A (FIG. 1) to a bit plane C with respect to the relative position (0,0), thereby obtaining the pixel array of FIG. 5. In step S3, the MPU 6 executes bitblt processing for ANDing, i.e., ANDs the inverted pixel array of the bit plane B (FIG. 3) and the transferred array of the bit plane C (FIG. 5) with respect to a relative position (1,0) (FIG. 4). As a result, only a pixel array shown in FIG. 6 remains on the bit plane C. In step S4, the MPU executes bitblt processing for transfer, i.e., transfers the pixel array of the bit plane C to a bit plane D (not shown) with respect to the relative position (0,0). Thereafter, in step S5, the original figure of the bit plane A is transferred on the bit plane C with respect to the relative position (0,0), and then in step S6, bitblt processing for ANDing is executed AND the inverted pixel array of the bit plane B and the array of the bit plane C with respect to a relative position (−1,0). As a result, a pixel array of FIG. 7 is obtained on the bit plane C. Then, in step S7, bitblt processing for ORing is executed to OR the pixel array of the bit plane C and the array of the bit plane D with respect to the relative position (0,0). Thereafter, in step S8, the original figure on the bit plane A is transferred to the bit plane C with respect to the relative position (0,0), and then in step S9, bitblt processing for AND is executed to AND the inverted pixel array of the bit plane B and the array of the bit plane C with respect to a relative position (0,1). As a result, a pixel array of FIG. 8 is obtained on the bit plane C. In step S10, bitblt processing for ORing is executed to OR the pixel array of the bit plane C and the array of the bit plane D with respect to the relative position (0,0). Thereafter, in step S11, the original figure of the bit plane A is transferred to the bit plane C with respect to the relative position (0,0), and then in step S12, bitblt processing for ANDing is executed to AND the inverted pixel array of the bit plane B and the array of the bit plane C with respect to a relative position (0, −1). As a result, a pixel array of FIG. 9 is obtained on the bit plane C. In step S13 bitblt processing for OR is executed to OR the pixel array of the bit plane C and the array of the bit plane D with respect to the relative position (0,0), thereby finally extracting inner edge pixels of FIG. 10.

(Second Embodiment)

Figure 10:
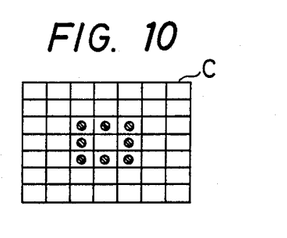
Figure 14:
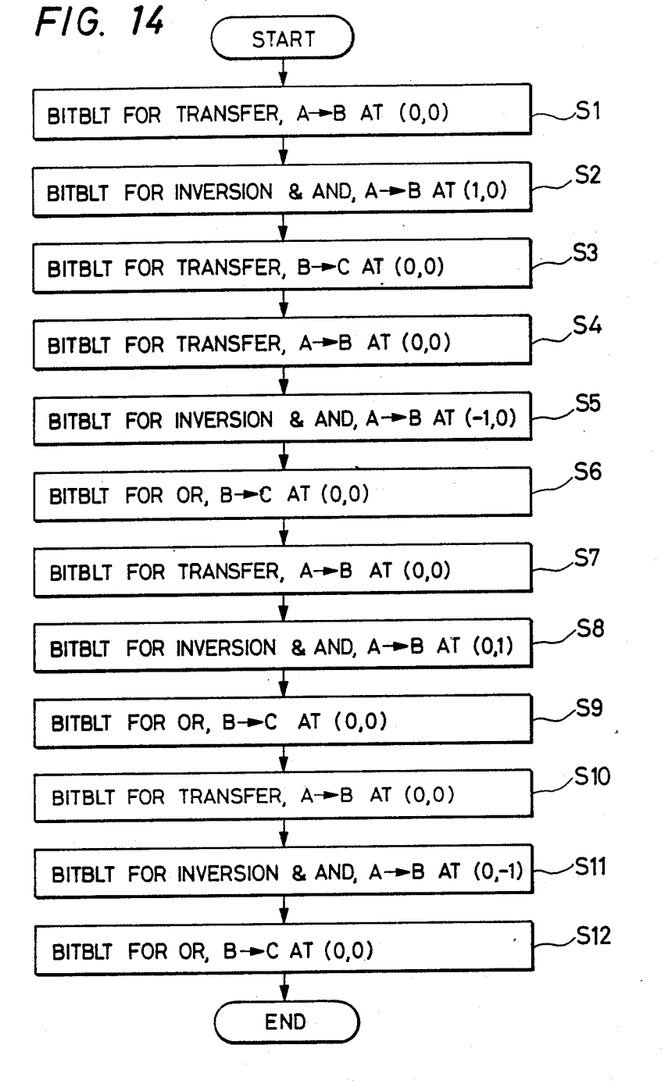

FIG. 14 shows a graphic edge extracting processing flow according to a second embodiment of the present invention. In step S1, bitblt processing for transfer is executed to transfer the original figure of the bit plane A to the bit plane B with respect to the position (0,0). Subsequently, in step S2, bitblt processing for inversion and ANDing is executed to invert the original figure of the bit plane A on the bit plane B with respect to the position (0,0) and to AND the transferred array (FIG. 5) and the inverted array (FIG. 3) with respect to the relative position (1,0), thereby obtaining the pixel array of FIG. 6 on the bit plane B. In step S3, the pixel array on the bit plane B is transferred to the bit plane C. Similarly, the original figure on the bit plane A is transferred to the bit plane B with respect to the position (0,0), and then bitblt operations for inversion and ANDing are executed with respect to the positions (−1,0), (0,1), and (0, −1), respectively, thereby obtaining the and pixel arrays of FIGS. 7, 8, and 9, respectively. If bitblt operations are executed onto the bit plane C with respect to the position (0,0) (step S4, to S12), the inner edge pixels of FIG. 10 are finally extracted.

(Third Embodiment)

Figure 11:
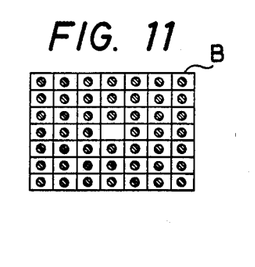
Figure 15:
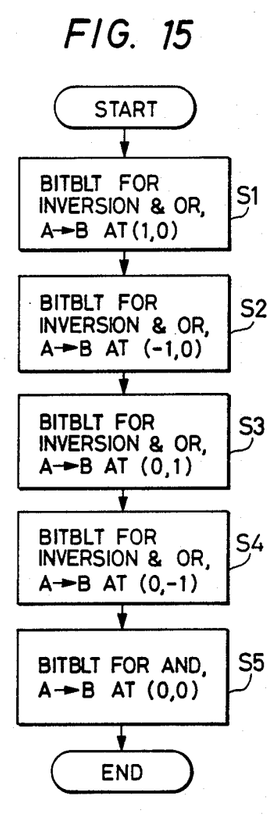

FIG. 15 shows a graphic edge extracting processing flow according to a third embodiment of the present invention. In steps S1 to S4, bitblt operations for inversion and ANDing are sequentially executed to perform inversion of and ANDing for the original figure of the bit plane A on the bit plane B with respect to the positions (1,0), (−1,0), (0,1), and (0, −1), respectively, thereby obtaining a pixel array of FIG. 11 on the bit plane B. In step S5, bitblt processing for ANDing is executed to AND the pixel array on the bit plane A of the array of the bit plane B with respect to the position (0,0), thereby obtaining the inner edge pixels of FIG. 10.

(Fourth Embodiment)

Figure 16:
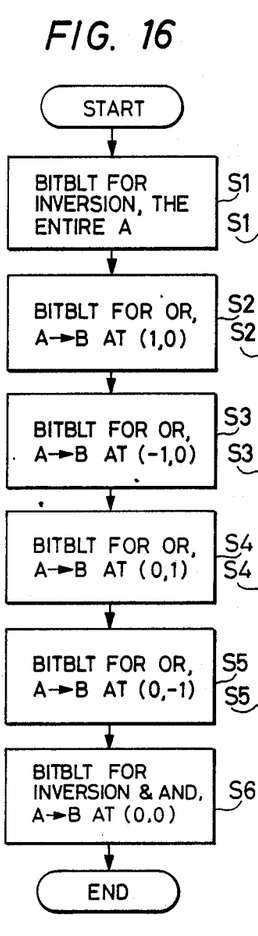

FIG. 16 shows a graphic edge extracting processing flow according to a fourth embodiment of the present invention. In Step S1, bitblt processing for inversion is executed to invert the original figure of the bit plane A on the bit plane A. Then, in steps S2 to S5, bitblt operations for OR are sequentially executed to perform ORing for the inverted pixel array of the bit plane A on the bit plane B with respect to the positions (1,0), (−1,0), (0,1), and (0, −1), respectively, thereby obtaining the pixel array of FIG. 11. Thereafter, in step S6, bitblt processing for inversion and ANDing is executed to perform inversion of and ANDing for the original figure of the bit plane A on the bit plane B with respect to the position (0,0). As a result, the inner edge pixels of FIG. 10 are finally extracted.

(Fifth Embodiment)

Figure 12:
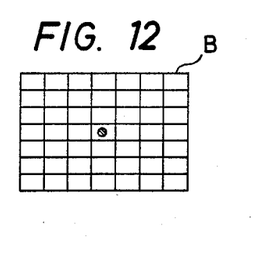
Figure 17:
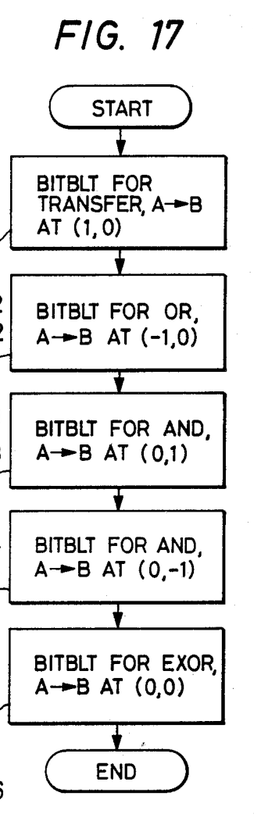
Figure 18:
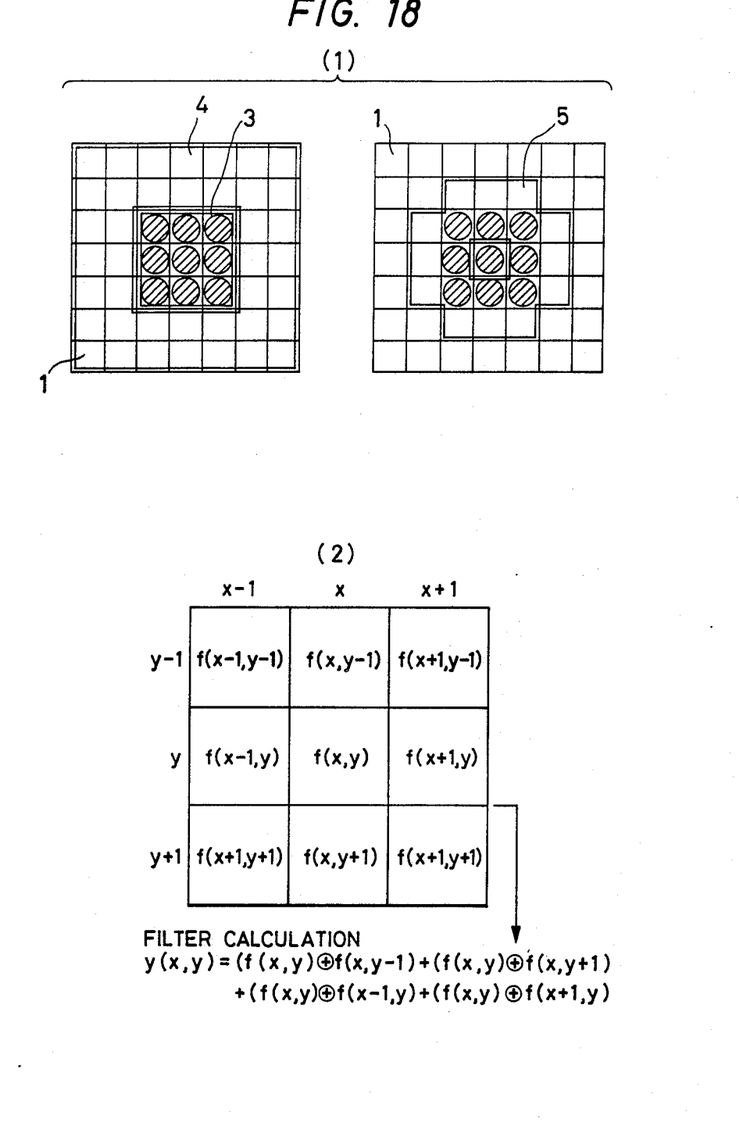

FIG. 17 shows a graphic edge extracting processing flow according to a fifth embodiment of the present invention. In step S1, the original figure on the bit plane A is transferred to the bit plane B with respect to the position (1,0). Then, in steps S2 to S4, bitblt operations for ANDing are sequentially executed to perform ANDing for the original figure of the bit plane A on the bit plane B with respect to the positions (−1,0), (0,1), and (0, −1), respectively, thereby obtaining the pixel of FIG. 12 on the bit plane B. Thereafter, in step S5, bitblt processing for EXORing is executed to EXOR the pixel (FIG. 12) and the array (FIG. 3) with respect to the position (0,0). As a result, the inner edge pixels of FIG. 10 are finally extracted.

Note that processing equivalent to the processing of the above embodiments can be obtained by changing the order of combinations of logical calculations of bitblt processing and hence can be variously modified.

As has been described above, the present invention is a graphic edge extracting apparatus for extracting inner edge pixels of a graphic image utilizing bitblt processing. Therefore, inner edge pixels of any graphic image can be extracted at high speed under the program control simpler than that of a conventional system using a filter calculation in memory access cycles fewer than those of the conventional system. In addition, an original graphic image can be easily reconstructed even if graphic image information is compressed using the edge pixels.

We claim:
1. A graphic edge extracting apparatus comprising:
   memory means for storing graphic image data; and
   graphic edge pixel extracting means for developing the graphic image data on a bit plane in a bit map memory of said memory means and executing a plurality of bitblt (bit block transfer: synthesis during drawing) processings, the bitblt processings including shifting of the relative position of the graphic image data as a whole, to extract inner edge pixels of the graphic image.
2. An apparatus according to claim 1, wherein said graphic edge pixel extracting means executes bitblt processing for transferring original graphic image data of a first bit plane to a second bit plane in said memory means without changing a relative position, bitblt processing for inverting the original graphic image data of the first bit plane and transferring an inverted image to a third bit plane without changing the relative position, and bitblt processing for ANDing the original graphic image data of the second bit plane and the image of the third bit plane by offsetting the relative position by one pixel, thereby extracting the edge pixels of the original graphic image data.

3. An apparatus according to claim 1, wherein said graphic edge pixel extracting means executes bitblt processing for transferring the original graphic image data of the first bit plane to the second bit plane in said memory means without changing the relative position and bitblt processing for performing inversion of and ANDing for the original graphic image data of the first bit plane on the second bit plane by offsetting the relative position by one pixel, thereby extracting the edge pixels of the original graphic image data.

4. An apparatus according to claim 1, wherein said graphic edge pixel extracting means executes bitblt processing for performing inversion of and ORing for the original graphic image data of the first bit plane on the second bit plane in said memory means by offsetting the relative position by one pixel and bitblt processing for performing ANDing for the original graphic image data of the first bit plane on the second bit plane without changing the relative position, thereby extracting the edge pixels of the original graphic image data.

5. An apparatus according to claim 1, wherein said graphic edge pixel extracting means executes bitblt processing for inverting the original graphic image data of the first bit plane thereon in said memory means, bitblt processing for performing ORing for the original graphic image data which is inverted on the first bit plane on the second bit plane by offsetting the relative position by one pixel, and bitblt processing for performing inversion of and ANDing for the inverted original graphic image data on the second bit plane without changing the relative position, thereby extracting the edge pixels of the original graphic image data.

6. An apparatus according to claim 1, wherein said graphic edge pixel extracting means executes bitblt processing for transferring the original graphic image data of the first bit plane to the second bit plane in said memory means by offsetting the relative position by one pixel, bitblt processing for performing ANDing for the original figure pixel data of the first bit plane on the second bit plane by offsetting the relative position by one pixel, and bitblt processing for performing EXORing for the original graphic image data of the first bit plane onto the second bit plane without changing the relative position, thereby extracting the edge pixels of the original graphic image data.

7. An apparatus according to claim 1, further comprising display means for displaying the graphic image data and the edge thereof.

8. An apparatus according to claim 1, further comprising means for outputting the extracted inner edge pixels.

9. An apparatus according to claim 1, further comprising means for storing the extracted inner edge pixels.

* * * * *

UNITED STATES PATENT AND TRADEMARK OFFICE
CERTIFICATE OF CORRECTION

PATENT NO. : 4,955,064

DATED : September 4, 1990

INVENTOR(S) : AKIFUMI SHIRASAKA, ET AL.

It is certified that error appears in the above-identified patent and that said Letters Patent is hereby corrected as shown below:

ON THE TITLE PAGE,
IN [56] REFERENCES CITED

"Fitzpatrick, Cella Harper & Scinto" should read
--Fitzpatrick, Cella, Harper & Scinto--.

COLUMN 1

Line 26, "caluculated" should read --calculated--.
Line 33, "differences the" should read --differences
(the-- and "them);" should read --them)--.

COLUMN 2

Line 3, "and MPU" should read --an MPU--.
Line 27, "occupying i.e.," should read
--occupying (i.e.,--.
Line 28, "of);" should read --of)--.

COLUMN 3

Line 3, "AND" should read --to AND--.
Line 27, "OR" should read --ORing--.
Line 52, "and" should be deleted.
Line 55, "(step S4, to S12)," should read
--(steps S4 to S12),--.

COLUMN 4

Line 10, "OR" should read --ORing--.

UNITED STATES PATENT AND TRADEMARK OFFICE
CERTIFICATE OF CORRECTION

PATENT NO. : 4,955,064

DATED : September 4, 1990

INVENTOR(S) : AKIFUMI SHIRASAKA, ET AL.

It is certified that error appears in the above-identified patent and that said Letters Patent is hereby corrected as shown below:

COLUMN 6

Line 14, "original figure pixel data" should read --original graphic image data--.

Signed and Sealed this

Sixteenth Day of June, 1992

Attest:

DOUGLAS B. COMER

Attesting Officer

Acting Commissioner of Patents and Trademarks